United States Patent [19]

Midgley et al.

[11] Patent Number: 5,295,042
[45] Date of Patent: Mar. 15, 1994

[54] DOUBLE BRANCH CIRCUIT BREAKER SUPPORT

[75] Inventors: Stephen G. Midgley, Stratford; Joseph F. Noonan, Manchester; Robert J. Sabatella, Southington, all of Conn.; Robert A. Wall, Jr., Salisbury, N.C.

[73] Assignee: General Electric Company, New York, N.Y.

[21] Appl. No.: 1,510

[22] Filed: Jan. 6, 1993

[51] Int. Cl.$^5$ .............................................. H02B 1/04
[52] U.S. Cl. .................................... 361/634; 361/652
[58] Field of Search ................. 361/333–334, 361/346, 355–361, 363, 376; 335/8

[56] References Cited

U.S. PATENT DOCUMENTS

| | | | |
|---|---|---|---|
| 3,909,097 | 9/1975 | Roth et al. | 335/8 |
| 4,631,634 | 12/1986 | Raabe et al. | 361/358 |
| 4,713,728 | 12/1987 | Raabe et al. | 361/363 |
| 4,783,718 | 11/1988 | Raabe et al. | 361/363 |
| 5,046,173 | 9/1991 | Wall, Jr. | 361/353 |

Primary Examiner—Gregory D. Thompson
Attorney, Agent, or Firm—Richard A. Menelly

[57] ABSTRACT

A circuit breaker support assembly allows a pair of industrial-rated molded case circuit breakers to be double-branch connected within a lighting panelboard enclosure. One of the branch circuit breakers can then operate as a main circuit breaker thereby eliminating the separate main circuit breaker commonly used within such lighting panelboard enclosures.

5 Claims, 4 Drawing Sheets

DOUBLE BRANCH CIRCUIT BREAKER SUPPORT

BACKGROUND OF THE INVENTION

U.S. Pat. Nos. 4,631,634, 4,713,728 and 4,783,718 each describe lighting panelboard enclosures wherein a plurality of molded case circuit breakers connect with corresponding lighting loads within an industrial environment. A main circuit breaker or main lug connects upstream with the incoming electrical distribution power cables and a plurality of branch circuit breakers connect downstream in series with the main circuit breaker or lug and the lighting loads. In the panelboard enclosures described within the aforementioned patents, the main circuit breaker or main lug is supported on a separate assembly from the branch circuit breakers thereby requiring panelboard enclosures of extended length.

The branch-connected circuit breakers within the lighting panelboard enclosures are connected in a "double branch" arrangement whereby a pair of opposingly-facing circuit breakers are connected to the same branch strap. When a single branch circuit breaker is required to be connected with a separate branch strap, the arrangement described within U.S. Pat. No. 5,046,173 is employed. The double branch plastic support components are slightly modified to accommodate the single circuit breaker without requiring further changes to the panelboard enclosure.

It has been determined that one of the branch circuit breakers can be reverse-fed and then function as a main circuit breaker within the lighting panelboard enclosure. The arrangement of one of the branch circuit breakers as the main circuit breaker then allows the size of the panelboard enclosure to be substantially reduced.

One purpose of the invention is to provide means for arranging a pair of branch circuit breakers within a panelboard enclosure in a double branch arrangement with only slight modification to the existing branch circuit breaker support components within the enclosure.

SUMMARY OF THE INVENTION

A single circuit breaker support assembly within a lighting panelboard enclosure is modified to support a pair of circuit breakers in a double branch arrangement whereby one of the branch circuit breakers is back-fed connected upstream with the electrical distribution power cables to thereby operate as the main circuit breaker. The remaining branch circuit breakers within the enclosure are connected downstream with the lighting load in series with the upstream circuit breaker. Alternately, all of the double-branch circuit breakers can be connected down-stream with lighting load, in series with an upstream main circuit breaker.

DESCRIPTION OF THE PREFERRED EMBODIMENT

Figure 1:
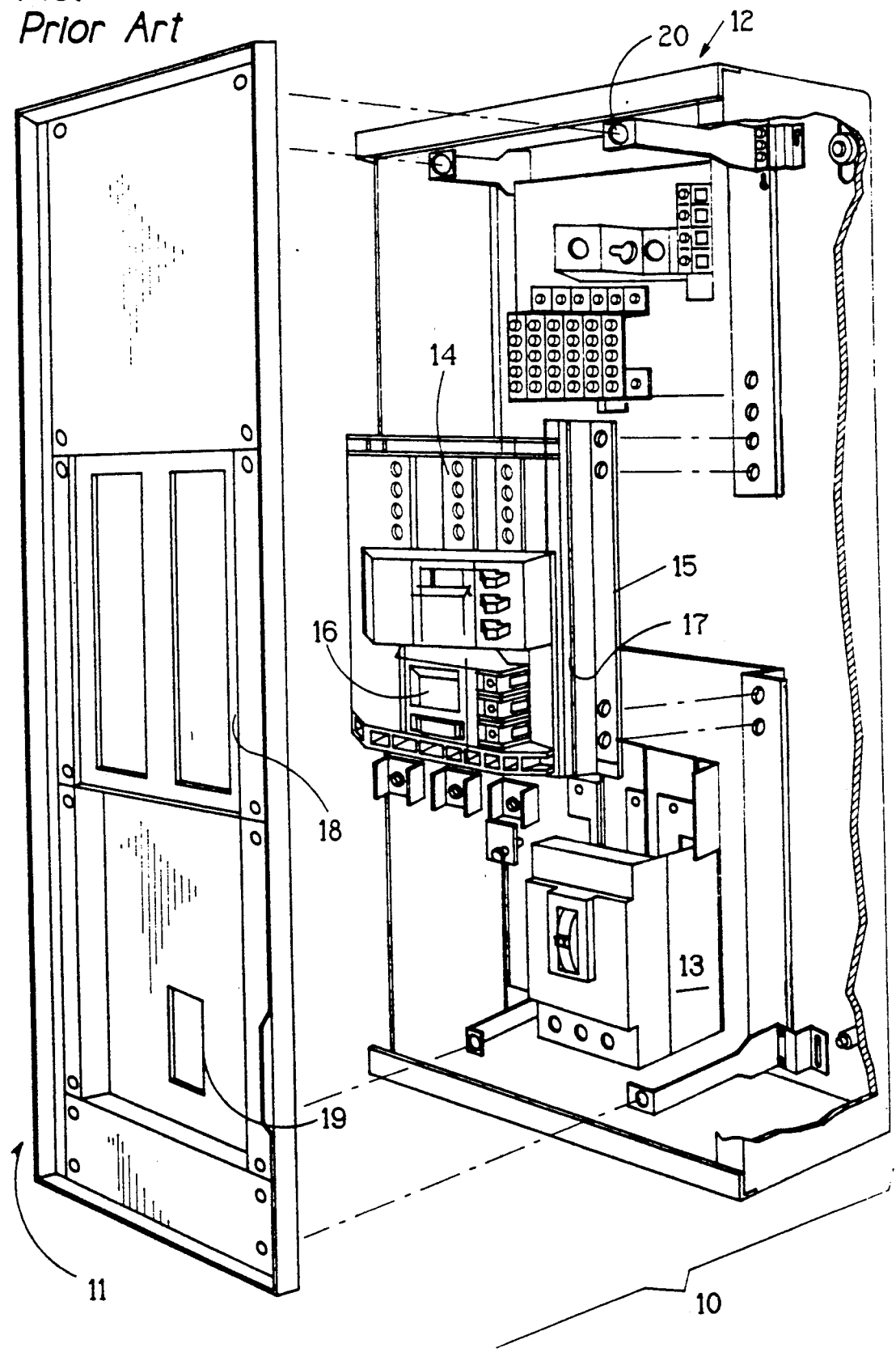
FIG. 1 is a front perspective view of a lighting panelboard enclosure according to the prior art with the dead front shield removed to depict the panelboard interior.

A lighting panelboard 10 is shown in FIG. 1 with the dead-front shield 11 removed to depict the interior of the enclosure 12 with a main circuit breaker 13 arranged at one end and connecting with a plurality of bus bar conductors 14 which are carried by a support frame 15. The panelboard is similar to that described within aforementioned U.S. Pat. No. 4,631,634 to which reference can be made for a more detailed description of the panelboard interior. The branch circuit breakers 16 connecting downstream in series with the main circuit breaker 13 are attached to the plastic support saddle 17 as indicated. External access to the branch circuit breaker operating handles is made by means of the openings 18 and the main circuit breaker operating handle is made by means of the single opening 19 when the dead-front shield 11 is attached to the enclosure 12 by means of the upstanding supports 20.

Figure 2:
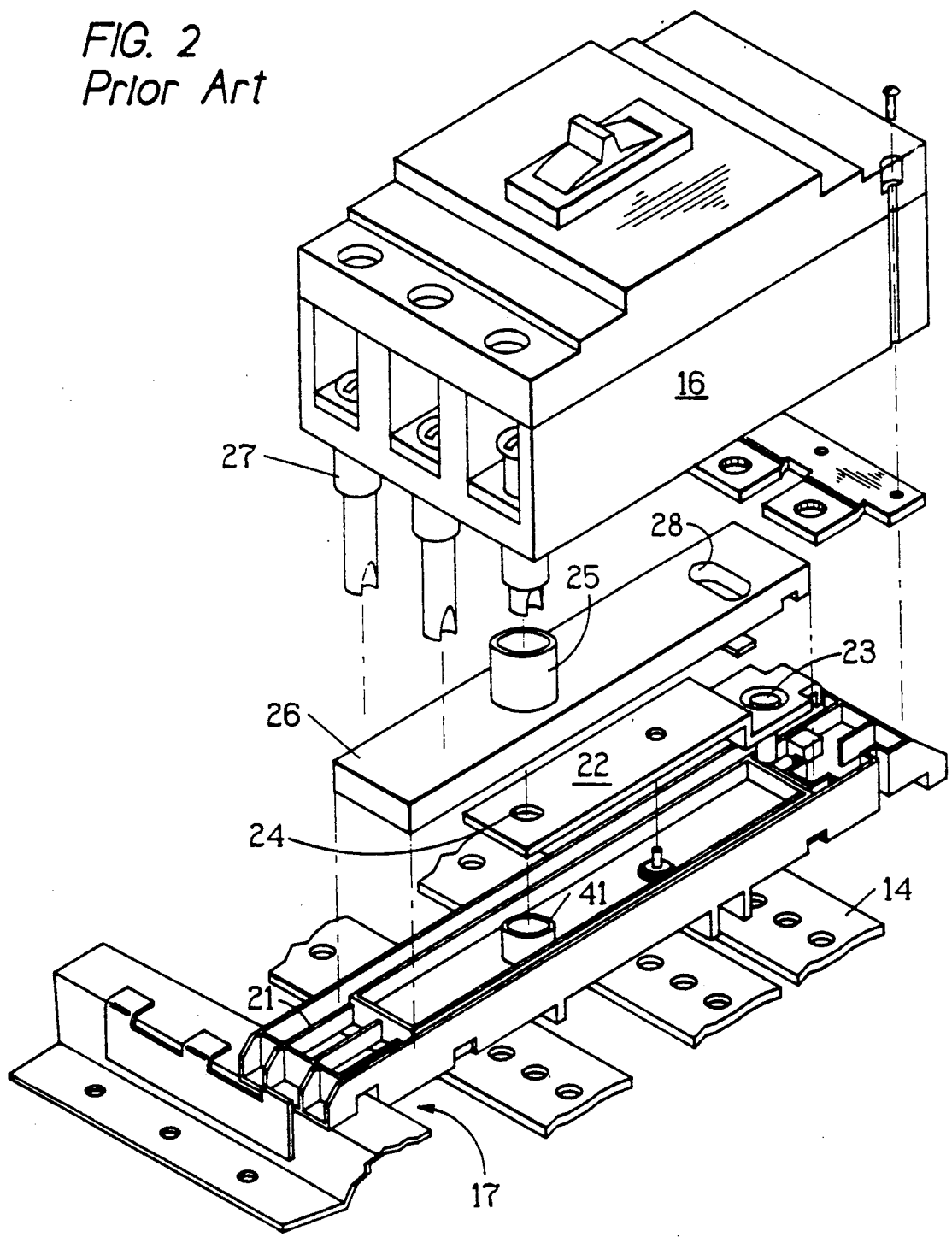
FIG. 2 is an enlarged top perspective view of the circuit breaker of FIG. 1 prior to assembly onto the single circuit breaker support structure.

A branch circuit breaker 16 is shown in FIG. 2 prior to attaching to the plastic support saddle 17. The saddle includes a plastic base 21 which contains the off-set load strap 22 which connects with the bus bar conductors 14 by means of a screw 23. When the associated plastic cover 26 is positioned on the plastic base 21, the circuit breaker 16 electrically connects with the load strap 22 by passing the combined screw and electrically-conducting cylinders 27, hereafter "screws" through the electrically-insulating tube 25 integrally-formed on the plastic cover 26 and threadingly engaging the opening 24 within the load strap 22.

Figure 3:
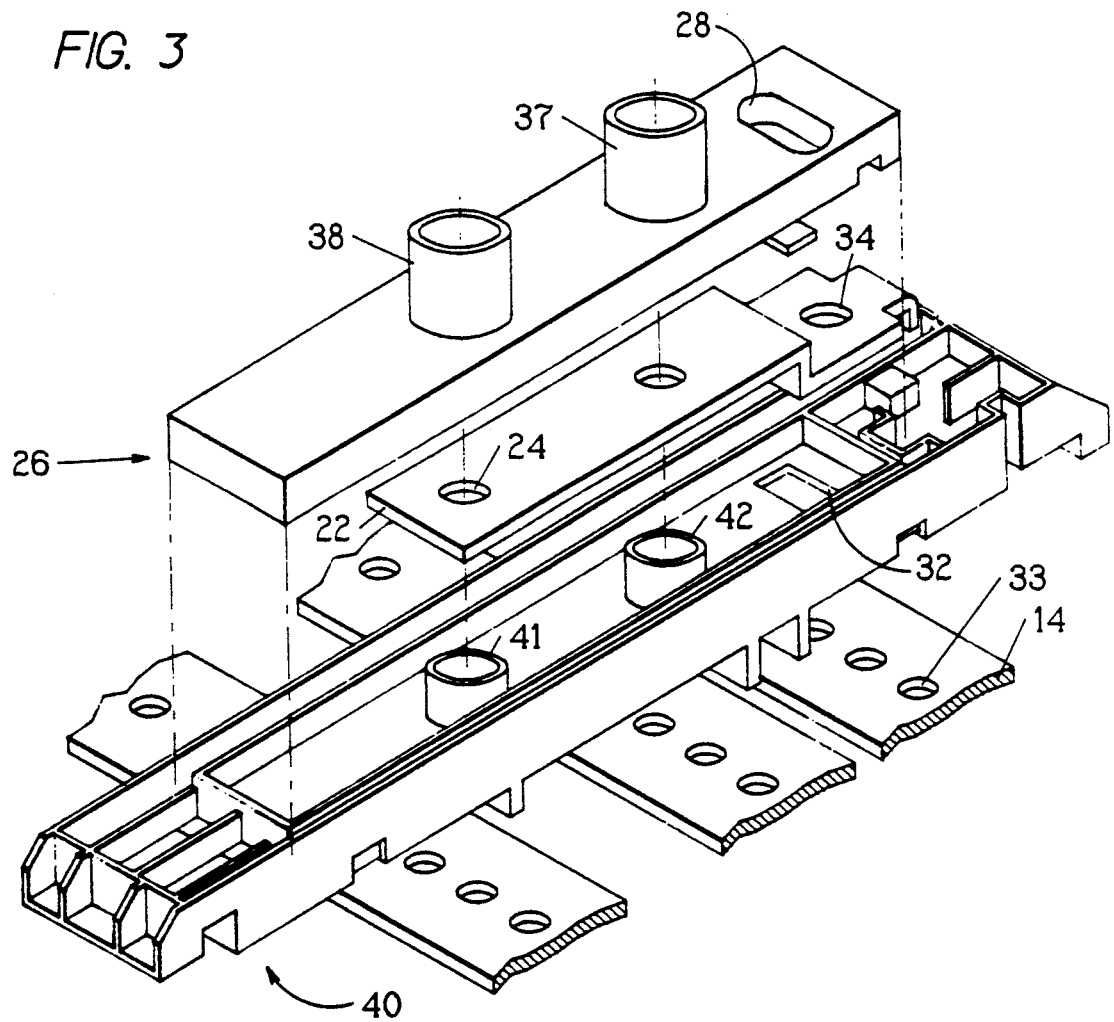
FIG. 3 is a top perspective view of the double branch circuit breaker support structure according to the invention prior to assembly.

The double branch plastic support saddle 40 of the invention is shown in FIG. 3 to include a pair of tubular caps 41, 42, integrally-formed on a bottom surface of the support saddle subjacent the threaded openings 24 formed within the offset load strap 22. The corresponding electrically-insulating tubes 37, 38 integrally-formed within the plastic cover 26 accept the circuit breaker attachment screws described earlier which engage the threaded openings 24 in the load strap 22 to thereby allow a pair of circuit breakers to engage a common load strap in a double branch arrangement. The caps insulate the ends of the screws from contacting the remaining bus bar conductors to insure electrical connection with a single bus bar conductor for each phase of a multi-phase electrical power distribution circuit. The access slot 28 in the plastic cover 26 and the access slot 32 in the saddle 40 allow connection with the selected bus bar conductor by means of the screw 38, thru-hole 34 and threaded opening 33 in the bus bar conductor 14, as indicated. The perimetric sidewalls on the cover 26 fit within the sidewalls of the support saddle 40.

Figure 4:
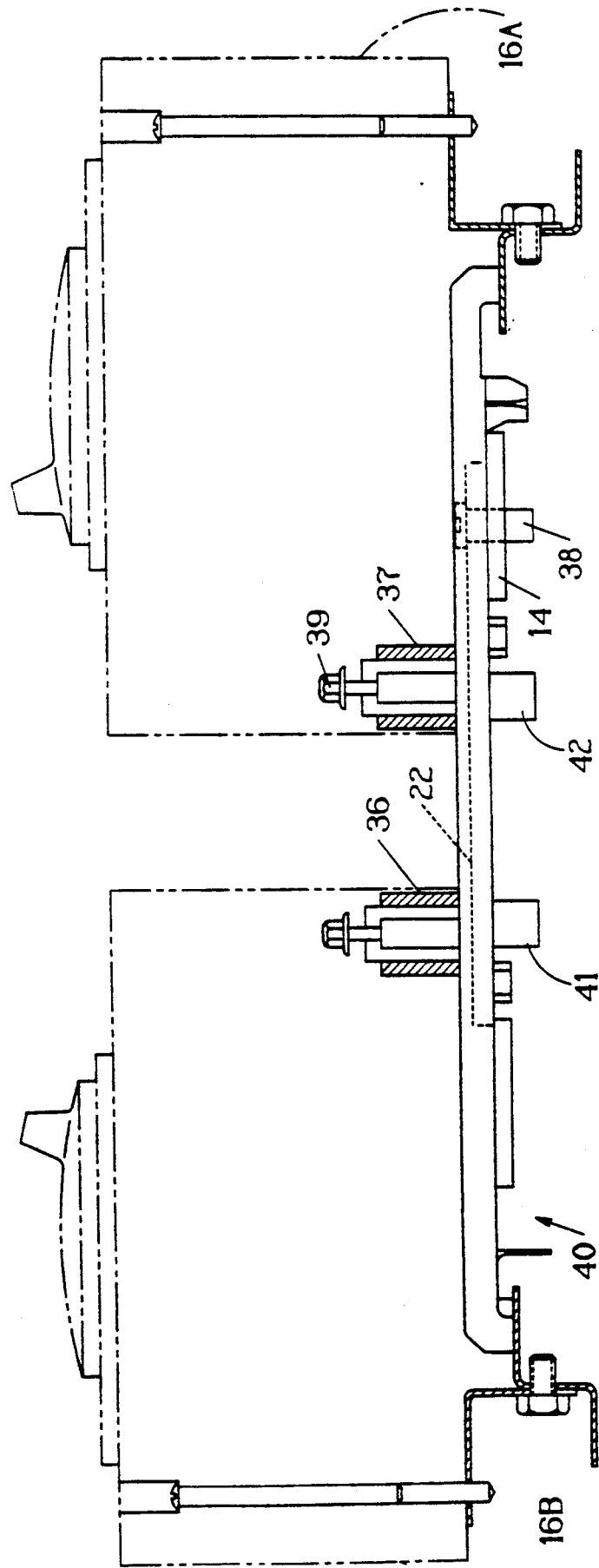
FIG. 4 is a side view of the double branch circuit breaker support structure of FIG. 3 with a pair of circuit breakers attached.

The plastic support saddle 40 with a pair of circuit breakers 16A, 16B attached in a double branch arrangement is shown in FIG. 4. The screws 39 within tubes 36, 37, effectively connect the line ends of the circuit breakers with the corresponding load strap 22, which branch strap is connected with the selected bus bar conductor 14 by means of screw 38. The screws 39 are effectively insulated from the bus bar conductors of the remaining phases by means of the caps 41, 42 which extend below the saddle 40.

An arrangement has herein been described which allows a single branch circuit breaker support saddle to be converted to a double branch arrangement for connecting a pair of circuit breakers to a common load strap. The double branch circuit breaker thereby allows reduction in the length of a lighting panelboard enclosure with a corresponding reduction in the overall panelboard cost.

Having thus described our invention, what we claim as new and desire to secure by Letters Patent is:

1. A molded case circuit breaker insulative support comprising in combination:
   a rectangular plastic support piece defining perimetric upstanding sidewalls;
   a slotted opening through a bottom of said support piece providing access to bus bar conductors subjacent said support piece;
   a load strap within said support piece, said load strap including a pair of spaced first apertures arranged for receiving circuit breaker connecting means and a second aperture arranged for receiving means for connecting said load strap to one of said bus bar conductors; and
   a plastic cover co-extensive with said support piece, said cover including a pair of spaced tubes co-extensive with said spaced apertures, circuit breaker connecting means extending through said spaced tubes into connection with said with said first apertures to electrically connect a circuit breaker with said load strap and said one bus bar conductor,
   said spaced tubes being integrally-formed with said cover and extending upwards from a top surface of said cover.

2. The molded case circuit breaker insulative support of claim 1 wherein said cover includes perimetric depending sidewalls received within said upstanding sidewalls on said support piece.

3. The molded case circuit breaker insulative support of claim 1 wherein said support piece includes a pair of spaced caps integrally-formed therein and extending from a bottom surface of said support piece, said caps providing electrical insulation between circuit breaker connection means and said bus bar conductors.

4. A molded case circuit breaker insulative support comprising in combination:
   a rectangular plastic support piece defining perimetric upstanding sidewalls;
   a slotted opening through a bottom of said support piece providing access to bus bar conductors subjacent said support piece;
   a load strap within said support piece, said load strap including a pair of spaced first apertures arranged for receiving circuit breaker connecting means and a second aperture arranged for receiving means for connecting said load strap to one of said bus bar conductors; and
   a plastic cover co-extensive with said support piece, said cover including a pair of spaced tubes co-extensive with said spaced apertures, circuit breaker connecting means extending through said spaced tubes into connection with said with said first apertures to electrically connect a circuit breaker with said load strap and said one bus bar conductor,
   said load strap including an off-set piece and wherein said second aperture is formed in said off-set end.

5. A circuit breaker panelboard assembly comprising:
   an open-ended closure containing a plurality of first molded case circuit breakers arranged for electrical connecting with branch circuits of a multi-phase electrical power distribution circuit;
   first mounting means within said closure supporting said first circuit breakers and providing electrical connection with electric bus bar conductors within said closure and arranged for external electrical connection with said multi-phase power distribution branch circuit; and
   second mounting means within said closure supporting a pair of second molded case circuit breakers in series circuit with said first circuit breakers, both of said second circuit breakers being connected to a common load strap, which common load strap is connected with one phase of said multi-phase electrical power distribution system, said second mounting means comprises:
   a rectangular plastic support piece defining perimetric upstanding sidewalls;
   a load strap within said support piece and connected with said one bus bar conductor, said load strap including a pair of space apertures;
   a plastic cover co-extensive with support piece, said cover including a pair of spaced tubes co-extensive with said spaced apertures, circuit breaker connecting means extending through said spaced tubes into connection with said first apertures to electrically connect said second circuit breakers with said load strap and said one bus bar conductor.

* * * * *